Oct. 13, 1959      H. H. HOADLEY      2,908,455
SURFACE COOLING MEANS FOR AIRCRAFT
Filed April 11, 1957

VELOCITY PROFILE

TEMPERATURE PROFILE

TEMPERATURE PROFILE WITH SURFACE COOLING

INVENTOR
HENRY H. HOADLEY
BY
ATTORNEY

United States Patent Office 2,908,455
Patented Oct. 13, 1959

2,908,455

SURFACE COOLING MEANS FOR AIRCRAFT

Henry H. Hoadley, Manchester, Conn., assignor to United Aircraft Corporation, East Hartford, Conn., a corporation of Delaware Application April 11, 1957, Serial No. 652,156

5 Claims. (Cl. 244—117)

This invention relates to high speed aircraft and more particularly to hypersonic vehicles which are subject to aerodynamic heating.

It is an object of this invention to provide a means for preventing excessive temperatures particularly on the surfaces of hypersonic vehicles which are subject to aerodynamic heating.

It is a further object of this invention to provide a means for cooling the outer surfaces of hypersonic vehicles by providing porous exudation of vapors through the outer skin of the vehicles.

These and other objects of this invention will become readily apparent from the following detailed description of the drawing in which.

It is well known that high speed vehicles which may be subject to flight speeds ranging upward of a Mach number of 3 are subject to serious aerodynamic heating of the surfaces primarily due to the slowing up of the air particles in the boundary layer thereby converting the energy of the air particles into heating. It has been shown that porous wall type cooling is quite effective for external surfaces subject to aerodynamic heating. However, one of the main difficulties with this type of application to the surface of an airplane is that complicated ducting and distribution systems are required. It is therefore the primary purpose of this invention to avoid excessive ducting by utilizing spaced structural members which can carry both reinforcing elements as well as a coolant supply retained by a lightweight absorptive material.

Figure 1:
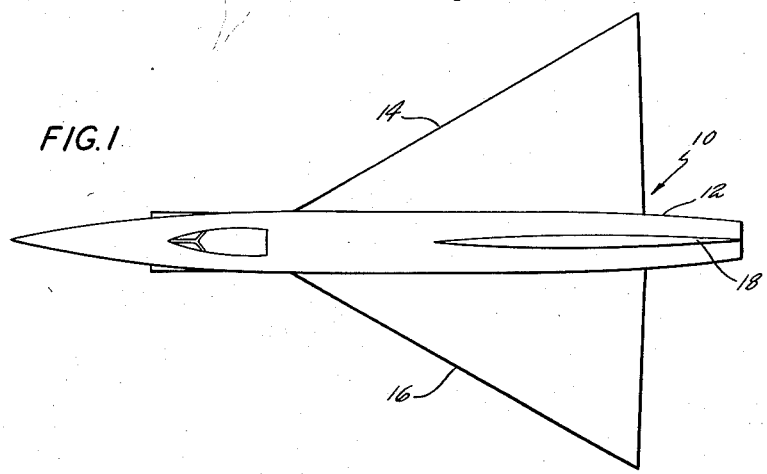
Fig. 1 is a schematic showing of a typical high speed aircraft.

Referring to Fig. 1, a typical high speed aircraft is generally indicated at 10 as having a main fuselage 12, wings 14 and 16, and a tail section 18. At extremely high air speeds the external surface of both the wings and the fuselage or other exposed surfaces of the aircraft and also the internal surfaces exposed to the airflow will be subject to aerodynamic heating. The invention herein is not however limited to surfaces subject to aerodynamic heating but to other types of heating as, for example, in power plants or rocket motor surfaces. According to this invention the structural outer surface of the fuselage or wing may be constructed of sandwich type material as typically shown in Fig. 2 and Fig. 3.

Figure 2:
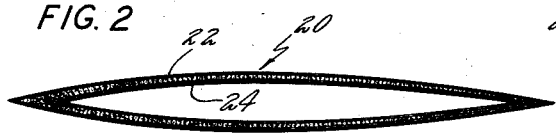
Fig. 2 is a cross section of an airfoil.

In Fig. 2 an airfoil is generally indicated at 20, by way of example only, since the invention herein has application to sustaining airfoils, the fuselage of aircraft, internal ducts, or the bodies of missiles. The airfoil 20 is shown here as having an outer layer 22 and an inner layer 24. The layers 22 and 24 are spaced apart with spacers between the layers 22 and 24. The size of the spacers may be determined by structural requirements but also by the amount of space required for a sufficient volume of absorptive filler therebetween to provide an adequate supply of coolant. Inasmuch as the heat transfer over a given surface decreases in a downstream direction, it could be generally stated that the spacing between the inner and outer layers 22 and 24 decreases in a downstream direction as a means of providing the variation of coolant volume required.

Figure 3:
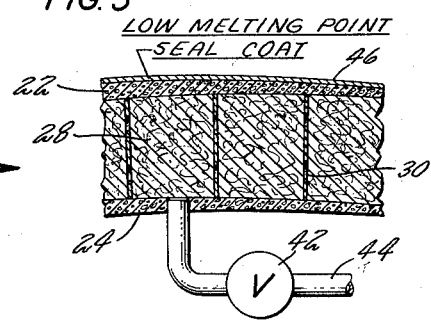
Fig. 3 is an enlarged detailed cross section for either the airfoil of Fig. 2 or any outer or inner structural shell of the vehicle needing cooling.

As better seen in Fig. 3, the inner and outer layers 22 and 24 are shown as being spaced apart. The space between these layers may contain an absorptive filler 28 with high capacity for holding a suitable coolant. The outer surface 22 is made of a porous material having the desired effective open area necessary to pass sufficient vapor. The space between the layers 22 and 24 may contain a plurality of webs 30 such as may be used in sandwich construction sometimes known as honeycomb construction. Inasmuch as the filler 28 may be a low conductor of heat, the spacing of the webs 30 may be designed and made of such a material as to insure the proper distribution of conduction of heat from the surface 22 and into the space between the layers 22 and 24. In this way the coolant material in the filler 28 can be heated to cause vaporization and subsequent exudation through the pores of the layer 22 in such a manner as to maintain the temperature of the structure below the critical value.

Figure 4:
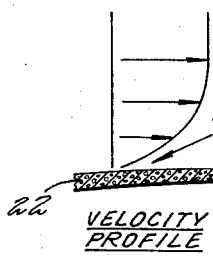
Fig. 4 shows a typical velocity profile on the external surface or on the internal surface of engine or air duct of a high speed vehicle.
Figure 5:
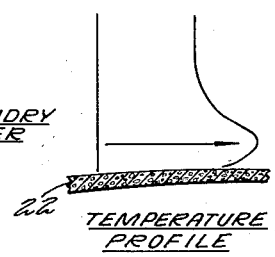
Fig. 5 shows a typical temperature profile for the surface of a high speed vehicle.
Figure 6:
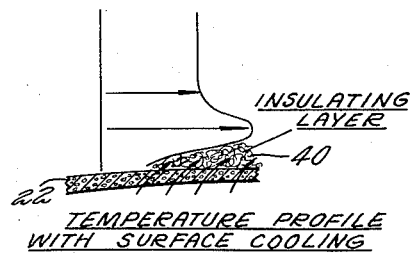
Fig. 6 shows a temperature profile for a high speed vehicle having coolant provided according to this invention.

At this point it may be stated that, as seen in Fig. 4, the boundary layer is a low velocity layer of fluid near the external surface of the high speed vehicle. As a result of this low moving boundary layer which increases in thickness in a downstream direction, the temperature will tend to have a profile as shown in Fig. 5. However, with a cooling system according to this invention, an insulating layer as shown at 40 will keep the temperature substantially low adjacent the surface 22. Thus, the temperature profile will assume a configuration such as that shown in Fig. 6.

The supply of coolant material to the filler 28 shown in Fig. 3 may be regulated by a valve 42 from a suitable supply source via the pipe 44. However, it may be desirable to spray the aircraft from the outside so that a sufficient amount of water, for example, may seep in through the pores of the porous surface 22 to fill the absorbent material 28. In this case it may be possible to design the aircraft or missile without any central coolant tank, transfer ducting, or cooling flow controls.

Where a valve 42 is used, the flow of coolant fluid to the absorptive filler 28 could be automatically regulated by suitable temperature sensing devices. On the other hand, in the case of a long range, high altitude missile, it may be desired to supply the absorptive filler 28 with coolant in a suitable manner and then to coat the outside with a seal 46 which has a melting point which is lower than that of the outer layer 22. Thus, for normal operating speeds where the surface temperature is not high enough to require cooling, the outer seal 46 would prevent the exudation of any coolant fluid. However, if, for example, a ballistic missile re-enters the dense atmosphere near the earth and the temperatures generated become very high, the sealing coat 46 would then melt away to open the pores of the layer 22 to provide vapor cooling therefor.

As a result of this invention, it is apparent that a highly efficient, low-weight and low-cost cooling means has been provided for hypersonic vehicles which are subject to aerodynamic heating.

Although only one embodiment of this invention has been illustrated and described herein, it will become apparent that various changes and modifications may be made in the construction and arrangement of the various parts without departing from the scope of this novel concept.

What it is desired by Letters Patent is:

1. In a vehicle having a high supersonic airstream flowing thereover, an outer shell for said vehicle comprising a pair of spaced apart layers of structural material, said layers forming major surfaces, the outer layer being porous and being exposed to the airstream substantially throughout its area, an absorbent filler between said layers and in juxtaposed relation with substantially the entirety of said outer surface, means for conducting heat from said outer layer through said filter, means for distributing a coolant material in said filler, said coolant being capable of high heat absorption during vaporization whereby during aerodynamic heating a vapor insulating layer is maintained on the outside of said outer layer by exudation through the pores thereof.

2. In a vehicle having a high supersonic airstream flowing thereover, an outer shell for said vehicle comprising a pair of spaced apart inner and outer layers of structural material, said layers forming major surfaces, the outer layer being porous and exposed to the airstream substantially throughout its area, an absorbent filler between said inner and outer layers, a coolant material dispersed throughout said filler, said coolant being capable of high heat absorption during vaporization whereby during aerodynamic heating a vapor insulating layer is maintained on the outside of said outer layer by exudation through the pores thereof, a sealing cover over the outside of said porous layer, said sealing cover comprising a material having a melting point lower than that of said porous layer thereby preventing exudation cooling until a predetermined temperature has been reached.

3. In a vehicle having a high supersonic airstream flowing thereover, an outer shell of said vehicle comprising in part at least inner and outer layers spaced apart and forming a space therebetween, the spacing of said layers decreasing in a downstream direction, said layers forming major surfaces, at least the outer layer being porous and exposed to the airstream throughout its area, an absorbent filler between said layers for storing and uniformly dispersing a coolant material, the thickness of said filler varying with the spacing of said layers, means for supplying a coolant material to said space for absorption by said filler, and means responsive to aerodynamic heating of said outer layer for vaporizing said coolant material and providing a layer of insulating vapor between the airstream and the exposed side of said outer surface.

4. In a vehicle having a high supersonic airstream flowing thereover, an outer shell of said vehicle comprising in part at least inner and outer layers spaced apart and forming a space therebetween, the spacing of said layers decreasing in a downstream direction, said layers forming major surfaces, at least the outer layer being porous and exposed to the airstream substantially throughout its area, and absorbent filler between said layers for storing and uniformly dispersing a coolant material, the thickness of said filler varying with the spacing of said layers, means for supplying a coolant material to said space for absorption by said filler, means responsive to aerodynamic heating of said outer layer for vaporizing said coolant material and providing a layer of insulating vapor between the airstream and said outer surface, and means for regulating the vaporization and exudation of the coolant material.

5. In a body, at least one substantially major surface exposed to an airstream of high supersonic Mach numbers thereby subjecting the surface to high temperatures, said surface being porous substantially throughout its area, means for exuding through the pores of said surface cooling material having high heat absorption characteristics for vaporization, said material after vaporization forming a continuous insulating layer between the airstream and the exposed side of said surface substantially throughout the area of said surface, and means for regulating the supply of cooling material including a volume of absorptive material having a second surface disposed adjacent to and extending substantially throughout the shielded side of said first-mentioned surface.

References Cited in the file of this patent

UNITED STATES PATENTS

| 301,744 | Monch | July 8, 1884 |
| 669,421 | Luce | Mar. 5, 1901 |
| 2,468,820 | Goddard | May 3, 1949 |

FOREIGN PATENTS

| 552,439 | Great Britain | Apr. 7, 1943 |
| 569,301 | Great Britain | May 16, 1945 |